Dec. 13, 1955     C. BASS ET AL     2,726,470

BOBBER WITH FISH-ACTUATED HOOK

Filed Oct. 19, 1953

Charles Bass
Leo J. Spitka
INVENTORS

BY Clarence A. O'Brien
and Harvey B. Jacobson
Attorneys

# United States Patent Office 2,726,470
Patented Dec. 13, 1955

2,726,470

BOBBER WITH FISH-ACTUATED HOOK

Charles Bass and Leo J. Spitka, Michigan City, Ind.

Application October 19, 1953, Serial No. 386,680

2 Claims. (Cl. 43—15)

This invention relates to an improved spring-loaded fish-actuated fishing hook, and has reference in particular to a novelly designed bobber and means whereby a conventional-type fishhook is operatively mounted on said bobber.

Briefly, the preferred embodiment of the invention, that which is illustrated in the accompanying drawing, is characterized by a buoyant bobber having a passage, a stem slidably mounted in said passage, a trigger pivotally mounted on said stem and releasably engageable with said bobber in a manner to hold said stem in a receding trippable position relative to said bobber, a fishing hook, a release line connected at one end to said hook and at its opposite end to said trigger, and a coil spring cooperating with an end portion of said stem and bobber for normally retaining said stem in a fully released state and position.

More specifically, the invention has to do with a body which takes the form of a ball-shaped or an equivalent float which has an integral open-ended tube incorporated centrally therein and which defines the stated passage, said stem being a hollow tube which is appreciably longer than the open-ended tube, and this is slidable in the latter tube. The trip or trigger takes the form of a latch which is pivoted at one end in the bore of the tubular stem and is so arranged that the opposite end is spring projected through a slot provided in the side of the stem, and, what with the fact that the release cord, which carries the fishhook, is connected with the last named end of the trigger, said stem, which is spring-loaded, forcibly jerks the release cord and fishhook and effectively lodges the hook in the mouth of the fish as soon as the hook is taken by the fish.

Stated somewhat more explicitly, the bobber or float has diametrically opposite openings to accommodate the cooperating end portions of a tube fitted and secured in the float and providing the stated passage, a stem longer than the passage and slidable in said passage, said stem being also open-ended and tubular and having its ends flanged and providing shoulders, a coil spring encircling said stem at one end of the latter and held in place at one of its ends by the shoulder and having its other end resting upon said bobber, a trigger pivotally mounted on said stem and releasably cooperable with said bobber, a fishing hook, and a fish-pull-actuated trip line connected at one end with said fishhook and at its other end with said trigger, said trigger being in the form of a latch which, as before stated, is pivoted at one end in the bore of the tubular stem, the other end of the latch being projectible and retractable in respect to a slot in the side of the stem, spring means being provided in the bore of the tubular stem and cooperating with the latch for purposes of ensuring easy setting of the device.

Novelty is also predicated on the arrangement stated wherein the spring retracted end of the tubular stem is located at what is the normal top side of the bobber in which position it constitutes a visible signal enabling the user, when the water is sufficiently clear, to readily discern by the released and set positions of the stem precisely when the hook has been aptly released.

Structural features and advantages in addition to those referred to will, it is believed, become more evident from the following description and the accompanying sheet of drawings.

In the drawings, wherein like numerals are employed to designate like parts throughout the same:

Figure 3:
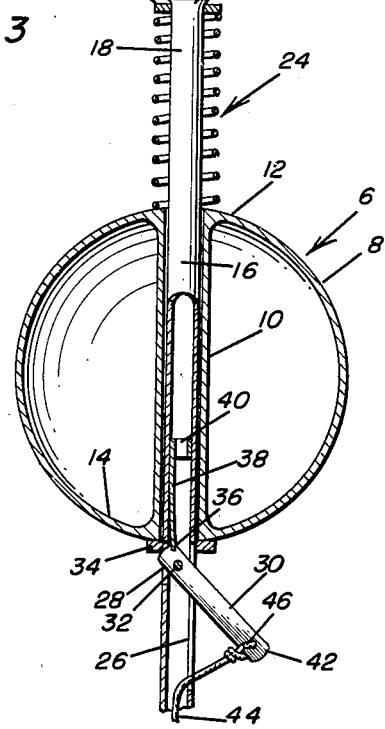
Figure 3 is a view in section and elevation showing the details of construction on a larger scale.
Figure 4:
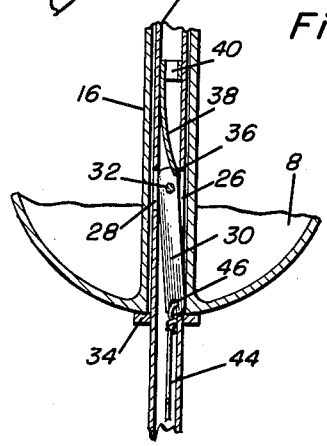
Figure 4 is likewise a view in section and elevation, which is fragmentary, and shows the position of the trigger when it is retracted into the stem in which the trigger is, of course, inactive.

Referring now to the drawings and to Figures 3 and 4, wherein the particulars are clearly seen, a buoyant body is denoted by the numeral 6. As before stated, this is preferably a ball-like float of appropriate material denoted at 8. The passage, which is central or axial through the float, is actually defined by a tube 10. The tube is of a length commensurate with the diameter of and has its end portions integral with the top and bottom portions 12 and 14 of the bobber. The stem is denoted at 16, and this is tubular and of a length greater than the length of the tube 10. The upper end portion 18 projects above the top of the bobber where it terminates in a shoulder-forming flange 20 which retains a stop washer 22 in place. The expansion spring is a simple coil spring, and this is denoted at 24, and it encircles the upper portion 18 and one end bears against the washer and the other end against the top of the bobber, as at 12. The lower end portion of the stem is provided with a long slot 26 on one side and a shorter slot 28 on the other side, and these slots serve to accommodate the trigger. The trigger is a simple latch 30. It is pivoted at one end, as at 32, in the bore of the tubular stem, and normally the latch or trigger is within the bore, as is shown in Figure 4. When it is set, however, one end portion projects through the slot 28 where it rests against the wear ring or washer 34. This same end is provided with a notch 36 which constitutes a keeper seat for the free end of a spring finger 38 which is also situated in the bore and which has a collar 40 at one end suitably fastened in said bore. It will be noted that the notch is to one side of the pivot, and the tension of the spring finger is such that it automatically projects the free end portions 42 of the latch through the accommodation slot 26. The trip cord is denoted at 44, and this is attached at 46 to the free end of the latch, and it is provided at its opposite end with a conventional fishing hook 48. The fishing line is denoted at 50 and a portion thereof is separably connected with the bobber by way of an eye 52 carried by the bobber and eccentric to the passage. There is a similar eye 54 on the leader or trip cord to which the relatively slack portion 56 of the line is attached.

Figure 1:
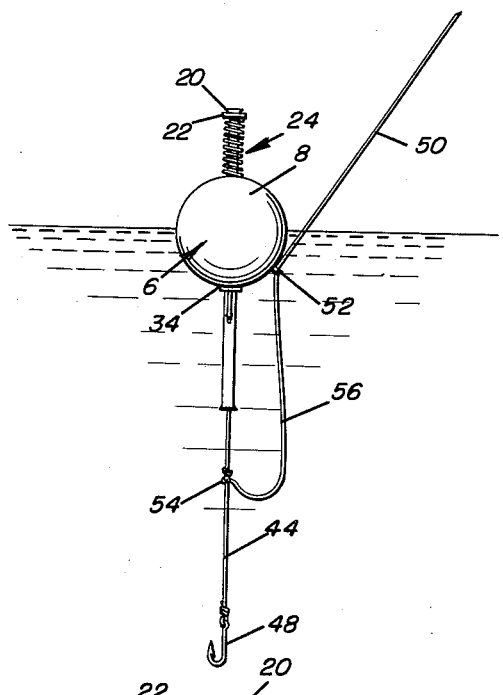
Figure 1 is an elevational view of a bobber with a fish-actuated hook and other associated mechanism constructed in accordance with the principles of the present invention and wherein the structure is shown in its set or ready-to-function position.
Figure 2:
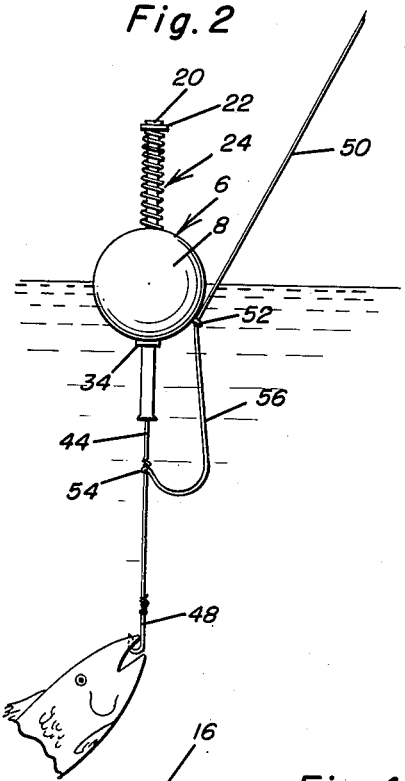
Figure 2 is a view of the same, but showing the relationship of parts after the fishhook has been released and lodged in the mouth of the fish.

It will be clear that the device or bobber is set for use by pushing the tubular stem 16 down through the passage and against the tension of the coil spring 24. This compresses the spring until the trigger or latch 30, under the action of the spring finger 38, "pops" out through the accommodation slot 26. The trigger, of course, rotates on the pivot 50 and the upper end portion engages the washer 34, thus setting the device in readiness for operation in an obvious manner. The fish trips the bobber by a slight tug on the bait carried on the hook 48. This tug tightens the trip cord 44 and, of course, releases the trigger whereupon the trigger recedes into the bore of the tubular stem, and the stem is then forcibly projected upwardly through the bobber from the position shown in Figure 1 to the position shown in Figure 2. The force of the spring acting on the stem and relative to the bobber, of course, causes the stem to yank the cord 44 into position and to forcibly sink the hook into the mouth of the fish in an obvious manner.

The fish line is fastened to the eye in the float and the end of the trigger release. Enough slack is allowed between the eye and the release cord to allow the pull on the hook to be transmitted to the trigger and not the eye. An eye is provided on both the float and the end of the trigger release in order that the bobber can be fastened at any desired position on the fish line without cutting the fish line. The device does not require constant watching because when the spring is in released position, it indicates a bite, which is another feature of this bobber.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fishing device comprising a buoyant bobber having an axially located open-ended tube embodied therein and defining a vertical passage, a stem longer than said passage, the intermediate portion of said stem being slidable in said passage and the respective upper and lower end portions extending above and below the respective top and bottom portions of said bobber, said stem being open-ended and tubular and having its upper end portion flanged and providing a spring retaining shoulder, a coil spring encircling said upper end portion of the stem with the uppermost convolution held in place by said shoulder, the lowermost convolution resting upon the top portion of said bobber, said stem being provided in one side with a relatively short slot and in a diametrically opposite side with a relatively longer slot, a linearly straight trigger-latch having one end portion hinged in the bore of said tubular stem with a corner thereof adapted to be located in and project outwardly beyond the short slot in a manner to be releasably engageable with a cooperating portion of said bobber, another corner portion of said trigger-latch, adjacent to the hinged end, having a keeper seat therein, the end of said trigger latch opposite to said hinged end, being adapted to extend outwardly through the long slot and beyond the tubular stem, a fish-pull-actuated trip line adapted to be connected at one end to a fishhook and extending through said stem and having one end portion adapted to extend through said long slot, said one end portion being connected with the last named end of said trigger latch, and at leaf spring having one end anchored and located in said bore, the opposite end of said spring being constantly engaged with said trigger-latch by way of said keeper seat.

2. A fishing device of the class described comprising a buoyant bobber having an axially located open-ended tube portion providing a passage therethrough, a stem longer than said passage, the intermediate portion of said stem being slidable in said passage and the respective end portions extending above and below the top and bottom portions of said bobber, said stem being also open-ended and tubular and having its respective ends flanged and providing shoulders, a coil spring encircling said stem at one end of the latter and held in place at one of its ends by the cooperating shoulder and having its other end resting upon the top portion of said bobber, a trigger having one end portion pivotally mounted in said stem and releasably cooperable with the bottom portion of said bobber, a fishing hook, and a fish-pull-actuated trip line connected at one end with said fishhook and at its other end with the other end of said trigger, said trigger comprising a latch portion on said one end portion of said trigger in the bore of the tubular stem, said latch portion being cooperable with a first slot provided in said stem in close proximity to said one end portion of said trigger, the other end of the trigger projecting through a second slot formed in the stem diametrically opposite to said first slot, and a leaf spring having one end anchored and located in said bore, the opposite end of said spring engaging in a keeper seat provided therefor in said one end portion of said trigger adjacent said latch portion.

References Cited in the file of this patent
UNITED STATES PATENTS

| 2,374,752 | Johnson | May 1, 1945 |
| 2,444,791 | Stahnke et al. | July 6, 1948 |

FOREIGN PATENTS

| 81,475 | Norway | Mar. 9, 1953 |
| 280,761 | Switzerland | May 1, 1952 |
| 763,268 | France | Apr. 26, 1934 |